United States Patent
Sanders et al.

(10) Patent No.: US 12,519,574 B2
(45) Date of Patent: Jan. 6, 2026

(54) SYSTEMS AND METHODS FOR ESTIMATING A PACKET DELAY MEASUREMENT

(71) Applicant: Verizon Patent and Licensing Inc., Basking Ridge, NJ (US)

(72) Inventors: Susan Wu Sanders, Bridgewater, NJ (US); Cindy Yuexin Dong, Bridgewater, NJ (US); Xin Wang, Morris Plains, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 357 days.

(21) Appl. No.: 18/298,954

(22) Filed: Apr. 11, 2023

(65) Prior Publication Data

US 2024/0348376 A1 Oct. 17, 2024

(51) Int. Cl.
*H04L 1/1825* (2023.01)
*H04L 43/0852* (2022.01)
*H04W 24/08* (2009.01)
*H04L 1/1812* (2023.01)

(52) U.S. Cl.
CPC ........ *H04L 1/1825* (2013.01); *H04L 43/0852* (2013.01); *H04W 24/08* (2013.01); *H04L 1/1812* (2013.01)

(58) Field of Classification Search
CPC ... H04L 1/1812; H04L 1/1825; H04L 1/1887; H04L 43/0852–087; H04W 24/02; H04W 24/08
See application file for complete search history.

(56) References Cited

U.S. PATENT DOCUMENTS

| 10,587,373 | B1 * | 3/2020 | Wang | H04L 1/1812 |
| 2017/0171879 | A1 * | 6/2017 | Jiang | H04L 1/1887 |
| 2022/0104229 | A1 * | 3/2022 | Zacharias | H04L 43/0852 |
| 2024/0298225 | A1 * | 9/2024 | Hyde | H04W 24/02 |
| 2025/0088445 | A1 * | 3/2025 | Wang | H04L 43/0852 |

* cited by examiner

*Primary Examiner* — Pao Sinkantarakorn

(57) ABSTRACT

In some implementations, a network node may collect performance measurements associated with a communication link between a network node and a user equipment, the performance measurements including at least one of: a total number of packets associated with each hybrid automatic repeat request (HARQ) retransmission group, of multiple HARQ retransmission groups associated with the communication link, or a total data volume associated with each HARQ retransmission group, of the multiple HARQ retransmission groups associated with the communication link. The network node may estimate a packet delay associated with the communication link based on the performance measurements.

20 Claims, 14 Drawing Sheets

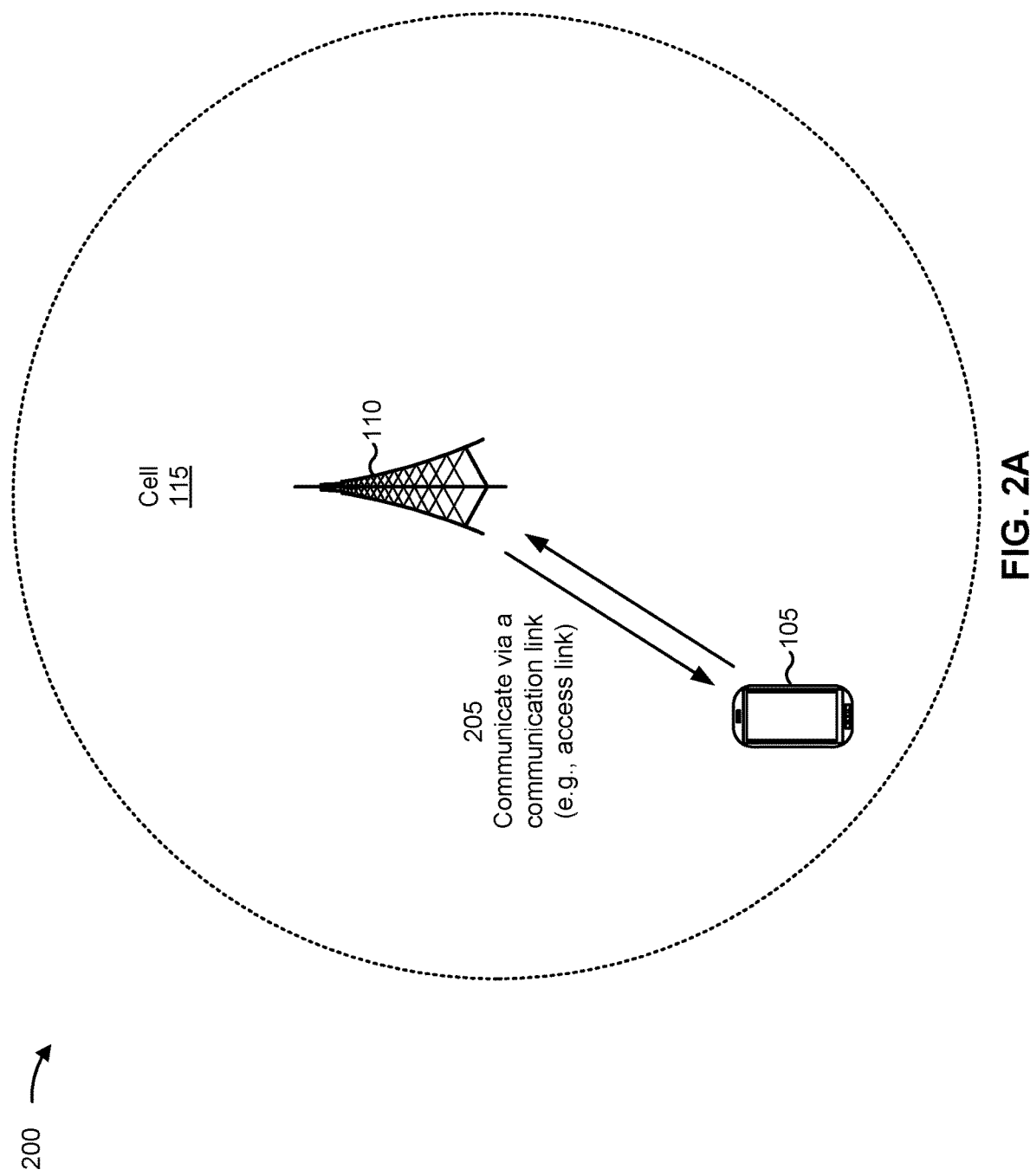

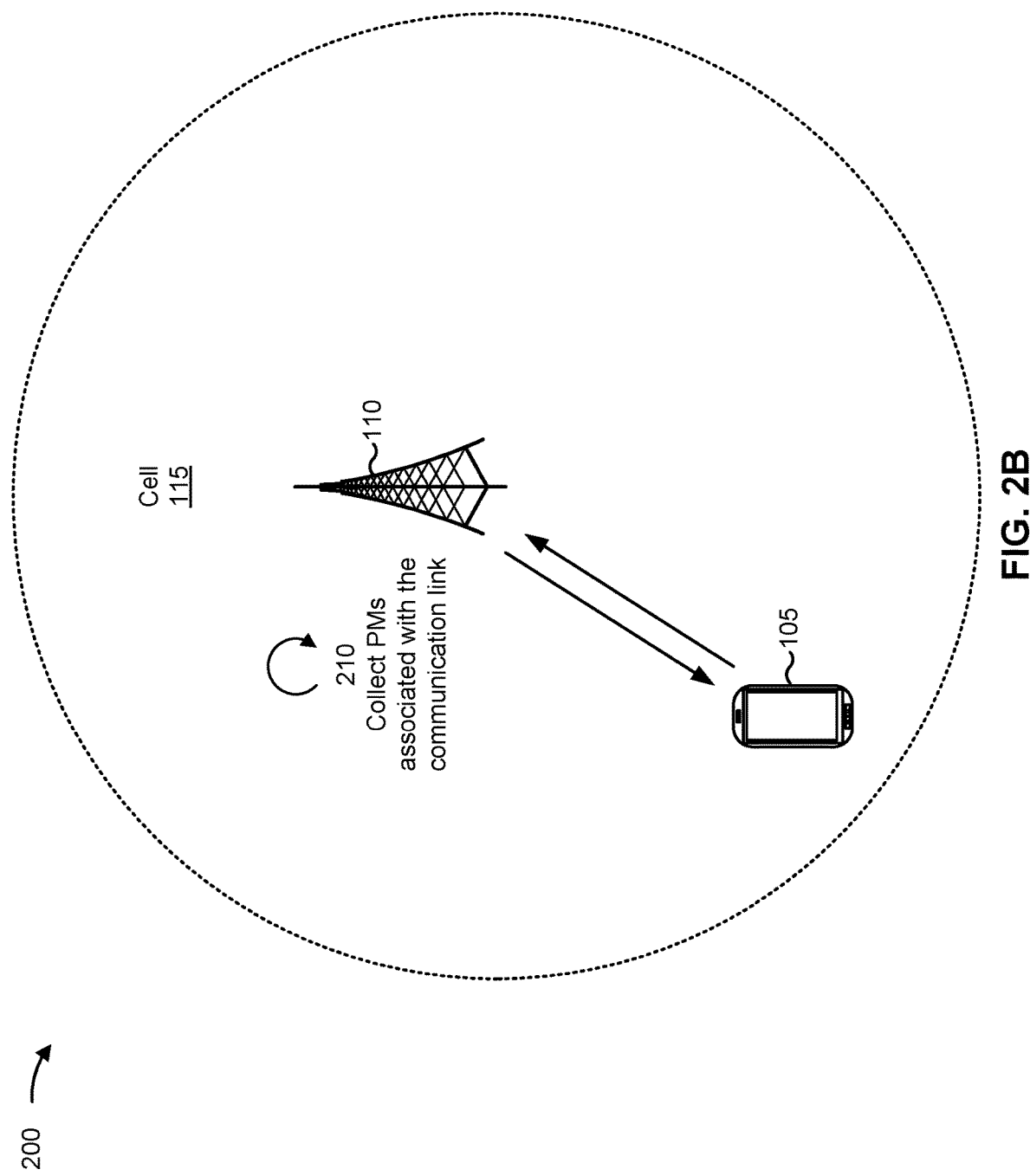

SYSTEMS AND METHODS FOR ESTIMATING A PACKET DELAY MEASUREMENT

BACKGROUND

A user equipment (UE) may establish a connection to a core network via a network node. The UE may communicate with the network node via downlink communications (e.g., communications from the network node to the UE) and uplink communications (e.g., communications from the UE to the network node). In some cases, downlink communications and uplink communications may be scheduled according to a time division duplex (TDD) slot pattern, in which certain symbols and/or slots are dedicated to downlink communications and other symbols and/or slots are dedicated to uplink communications. In some examples, a UE may provide feedback to a network node, indicating whether a downlink communication was safely received at the UE. For example, a UE may transmit a hybrid automatic repeat request (HARQ) acknowledgement (ACK)/negative acknowledgement (NACK) message using a slot dedicated for uplink communications, indicating whether a downlink message was safely received in a slot dedicated to downlink communications. In that regard, there may be a delay (sometimes referred to as a packet delay) between a time at which a downlink communication is transmitted by a network node and a time at which a corresponding HARQ ACK/NACK message is transmitted by a UE.

BRIEF DESCRIPTION OF THE DRAWINGS

FIGS. 2A-2G are diagrams of an example associated with estimating a packet delay measurement.

DETAILED DESCRIPTION OF EXAMPLE EMBODIMENTS

Figure 1A:
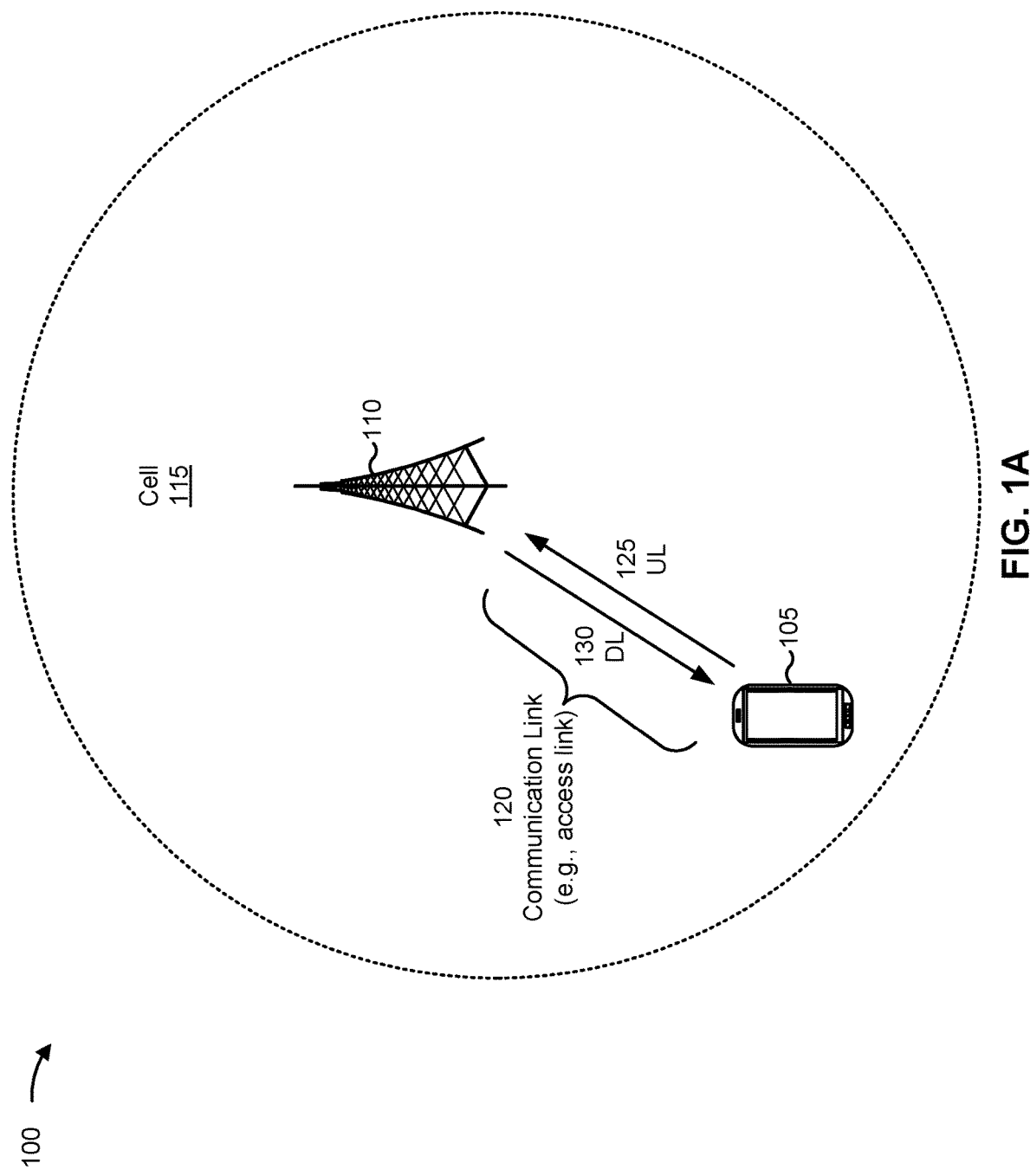
FIGS. 1A-1C are diagrams of an example associated with a wireless communication link between a network node and a UE.

The following detailed description of example implementations refers to the accompanying drawings. The same reference numbers in different drawings may identify the same or similar elements.

In certain wireless communication networks, such as a fourth generation (4G) wireless network (sometimes referred to as a long term evolution (LTE) network), a fifth generation (5G) wireless network (sometimes referred to as a new radio (NR) network), or a similar wireless network, a network node may measure a packet delay of a communication link for several purposes. For example, a network node may measure packet delay as an indicator of network congestion, such as for purposes of adapting one or more communication parameters and/or prioritizing high-priority flows and/or traffic during periods of high congestion. Performing accurate measurements of packet delay over an air interface may be a complex task that requires high power, computation, and memory resource consumption at the network node. As wireless communication links continue to evolve, resulting in higher throughput channels and thus increased network traffic, the task of measuring packet delay may become more and more onerous at the network node and/or require ever increasing power, computation, and memory resource consumption.

Some implementations described herein enable a network node to estimate packet delay based on performance measurements (PMs) that are already collected and available to the network node, thereby reducing or eliminating the onerous task of measuring an actual delay in a communication link. In some implementations, the PMs may indicate a number of hybrid automatic repeat request (HARQ) retransmissions associated with various packets and/or communications, which may be used by the network node to estimate an average packet delay in the communication link. In some implementations, the network node may estimate a packet delay based on one or more formulas using a number of HARQ retransmissions, each weighted by a corresponding delay coefficient, as inputs. In some other implementations, the network node may train and/or use a machine learning model to estimate a packet delay, using a number of HARQ retransmissions and/or network conditions (e.g., a network loading level) as inputs. As a result, a network node may estimate a packet delay associated with a communication link using data already available to the network node without requiring the network node to perform resource-intensive measurements and computations, thereby reducing power, computation, and/or memory resource consumption at the network node. Moreover, by estimating the packet delay in the communication link without requiring time-consuming computations, the network node may more quickly adapt a communication link when network congestion or similar link disruption is sensed by the network node, thereby improving a wireless communication link between the network node and a user equipment (UE). Quickly adapting a communication link between the network node and the UE may increase throughput and reduce latency in the communication link, and/or may reduce communication errors and thus reduce power, computing, and network resource consumption that would otherwise be required to correct communication errors.

Figure 1B:
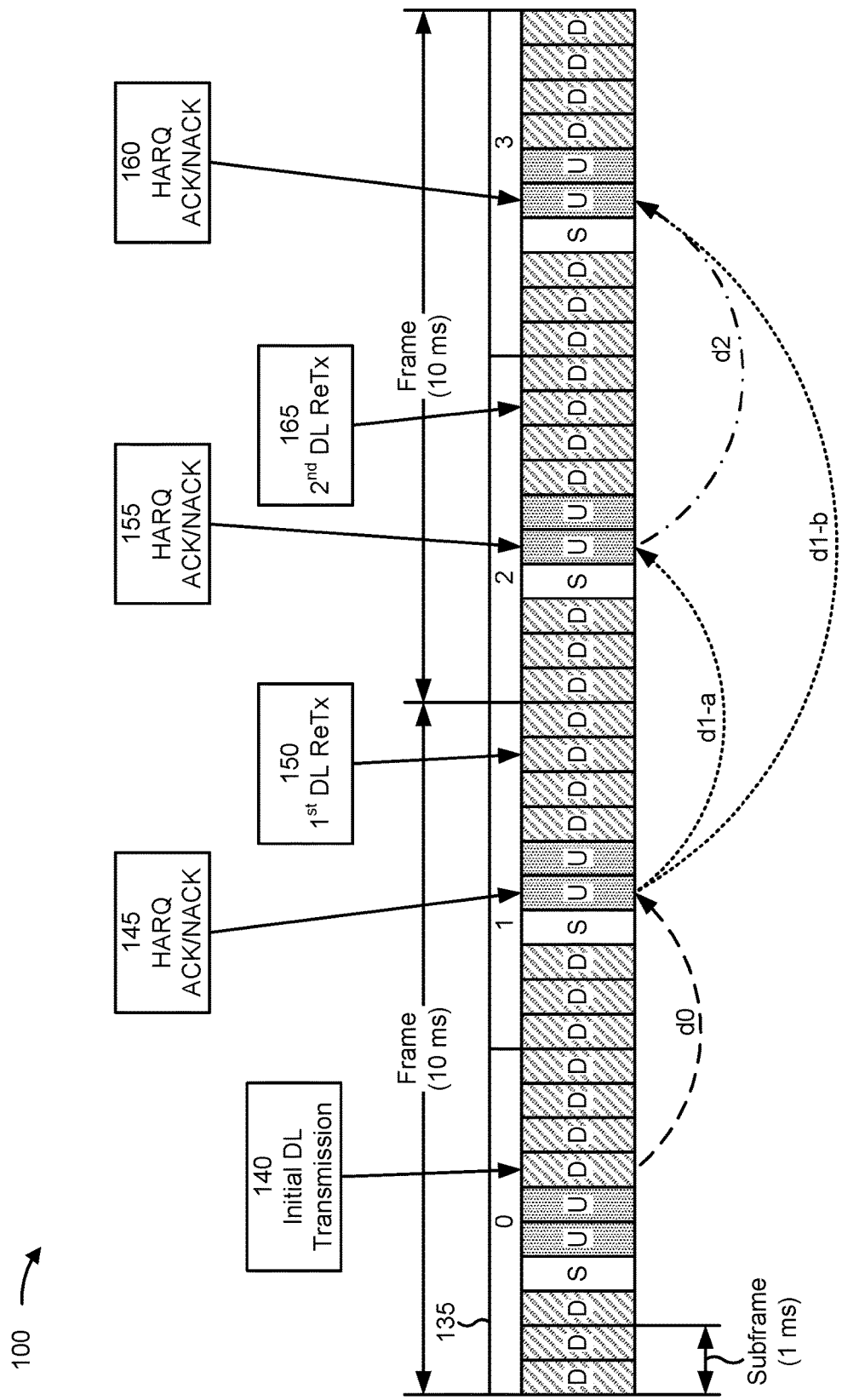
Figure 1C:
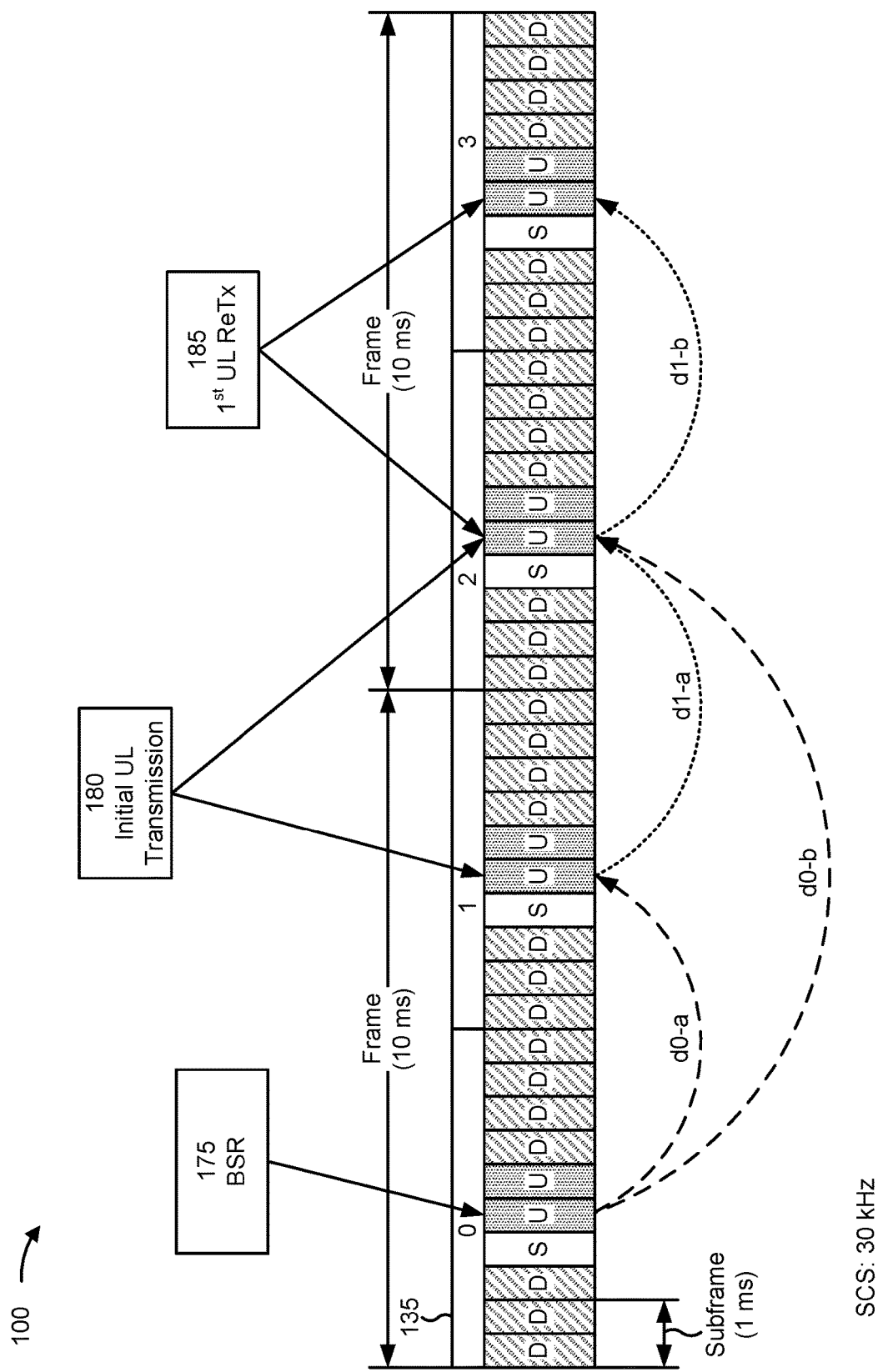

FIGS. 1A-1C are diagrams of an example 100 associated with a wireless communication link between a network node and a UE. As shown in FIGS. 1A-1C, example 100 includes a UE 105 and a network node 110 in wireless communication via a wireless network (e.g., a 4G network, a 5G network, or a similar network). In that regard, the network node 110 may be associated with an NR or 5G network node (sometimes referred to as a gNodeB (gNB)), an LTE or 4G network device (sometimes referred to as an eNodeB (eNB)), a radio access network (RAN) device, or a similar network device. Additionally, or alternatively, the network node 110 may be a base station (BS), a centralized unit (CU) of a disaggregated BS in an open RAN (O-RAN) architecture, a distributed unit (DU) of a disaggregated BS in an O-RAN architecture, and/or a radio unit (RU) of a disaggregated BS in an O-RAN architecture, among other types of network devices.

As shown in FIG. 1A, the network node 110 may provide coverage for a particular area, sometimes referred to as a cell 115. The network node 110 may be capable of providing coverage to a relatively large geographic area, sometimes referred to as a macrocell, or to a smaller area, sometimes referred to as a microcell, a picocell, a femtocell, a private cell, an onsite cell, and/or a similar cell. For example, a macro network node may be associated with a large antenna array and a high transmit power, providing broad coverage to many users within a macrocell, while an onsite network node may be associated with a smaller antenna array and/or a lower transmit power than a macro network node, and may provide coverage to a limited number of subscribers located within a particular building, located on a particular premises, or the like.

As shown in FIG. 1A, when the UE 105 is within the cell 115, the UE 105 may communicate with the network node 110 via a communication link 120 (sometimes referred to as a wireless communication link and/or an access link). The communication link 120 may include an uplink 125 (shown as "UL" in FIG. 1A) and a downlink 130 (shown as "DL" in FIG. 1A). The uplink 125 may be associated with communications transmitted by the UE 105 and received by the network node 110, and the downlink 130 may be associated with communications transmitted by the network node 110 and received by the UE 105. In some examples, the network node 110 may schedule uplink and downlink communications in order to minimize collisions at the network node 110 and/or the UE 105, and/or in order minimize interference with communications by neighboring network devices.

As shown in FIG. 1B and FIG. 1C, in some examples the UE 105 and the network node 110 may communicate using a time division duplex (TDD) slot pattern, sometimes referred to as a TDD frame structure 135. More particularly, a transmission timeline for downlink and uplink communications may be partitioned into radio frames (sometimes referred to as just frames), with each frame having a predetermined duration (e.g., 10 milliseconds (ms)) and partitioned into a set of subframes. Each subframe may have a predetermined duration (e.g., 1 ms) and may include a set of slots, with the number of slots in each subframe varying according to a subcarrier spacing (SCS) used for transmission. For example, the TDD frame structure 135 may be associated with a 30 kilohertz (kHz) SCS, in which each subframe includes two slots. In some other examples, a different SCS may be used, and thus more or fewer slots may be included in each subframe. For example, for a 15 kHz SCS, each subframe may include one slot, for a 60 kHz SCS, each subframe may include four slots, for a 120 kHz SCS, each subframe may include eight slots, and for a 240 kHz SCS, each subframe may include sixteen slots.

Each slot may include a number of orthogonal frequency-division multiplexing (OFDM) symbols (sometimes referred to as just symbols), such as, in some implementations, fourteen symbols. In that regard, for a 15 kHz SCS, each subframe may include 14 symbols, for a 30 kHz SCS, each subframe may include 28 symbols, for a 60 kHz SCS, each subframe may include 56 symbols, for a 120 kHz SCS, each subframe may include 112 symbols, and for a 240 kHz SCS, each subframe may include 224 symbols. In some cases, certain slots and/or symbols may be dedicated for use as downlink slots and/or symbols (e.g., may be reserved for scheduling downlink communications between the network node 110 and the UE 105, sometimes referred to as "D" slots), while certain other slots and/or symbols may be dedicated for use as uplink slots and/or symbols (e.g., may be reserved for granting uplink communications between the network node 110 and the UE 105, sometimes referred to as "U" slots).

In the example shown in FIG. 1B and FIG. 1C, the TDD frame structure 135 may be associated with a repeating pattern of DDDSUUDDDD slots in each half-frame. More particularly, in the depicted example, four repetitions of the DDDSUUDDDD slot pattern (indexed as 0-3 in FIG. 1B and FIG. 1C) are shown. In that regard, the first two repetitions of the DDDSUUDDDD slot pattern (e.g., the first twenty slots, or first two half-frames indexed as 0 and 1) are associated with a first radio frame, and the second two repetitions of the DDDSUUDDDD slot pattern (e.g., the second twenty slots, or second two half-frames indexed as 2 and 3) are associated with a second radio frame. In the TDD frame structure 135, the "D" slots may correspond to downlink slots (e.g., slots that are semi-statically configured by the network node 110 for use for downlink transmissions), the "U" slots may correspond to uplink slots (e.g., slots that are semi-statically configured by the network node 110 for use for uplink transmissions), and the "S" slots may correspond to special slots (e.g., a slot which contains a mixture of downlink, uplink, and/or guard period symbols, such as ten downlink symbols, a two symbol guard period, and two uplink symbols, among other examples).

FIG. 1B shows example packet delays associated with downlink transmissions. In some examples, a packet delay corresponding to a downlink transmission may be associated with a duration between a time at which the network node 110 transmits an initial downlink transmission and a time at which the UE 105 transmits a HARQ acknowledgment (ACK) communication indicating that the initial downlink communication, or a retransmission thereof, was safely received by the UE 105.

More particularly, as indicated by reference number 140, the network node 110 may transmit an initial downlink communication in a D slot, such as the fourth D slot in the first half-frame in the example shown in FIG. 1B (e.g., the fourth D slot in the half-frame indexed as 0 in FIG. 1B). If the UE 105 safely receives the downlink transmission, the UE 105 may provide HARQ ACK feedback in a U slot, such as the first U slot in the second half-frame in the example shown in FIG. 1B (e.g., the first U slot in the half-frame indexed as 1 in FIG. 1B), as indicated by reference number 145. In such examples, a packet delay associated with the downlink transmission may be equal to do, with "0" indicative that zero retransmissions of the downlink transmission were necessary in this example (e.g., the packet delay in this example would be eight slots).

In some examples, the UE 105 may feedback in a different U slot and/or half-frame. For example, the UE 105 may be configured with a HARQ parameter (sometimes referred to as a slot offset, a K1 parameter, a dl-DataToUL-ACK parameter, a physical downlink shared channel (PDSCH)-to-HARQ feedback timing indicator, or similar parameter) indicating a minimum time period (e.g., a minimum slot offset) between when a downlink transmission is received and when the UE 105 may provide feedback corresponding to the downlink communication (e.g., the K1 parameter may indicate a minimum delay between the end of the slot used to transmit a PDSCH and the start of the slot used to return a HARQ ACK communication). Accordingly, in aspects in which next available U slots (e.g., the U slots in the second half-frame in FIG. 1B) are not available for transmitting a HARQ ACK communication (e.g., because the slots do not occur at least a K1 period of time after the downlink transmission), the UE 105 may provide feedback in a later U slot, such as one of the U slots in the third half-frame. In such examples, do may be greater than the example do shown in FIG. 1B.

However, in examples in which the downlink transmission is not safely received, the UE 105 may provide HARQ negative acknowledgement (NACK) feedback in a U slot, such as the first U slot in the second half-frame in the example shown in FIG. 1B, as indicated by reference number 145. In such examples, the network node 110 may retransmit the downlink communication to the UE 105 using a D slot, such as the sixth D slot in the second half-frame in the example shown in FIG. 1B, as indicated by reference number 150. If the UE 105 safely receives the first downlink retransmission, the UE 105 may provide HARQ ACK feedback in an available U slot (e.g., a slot indicated according to a configured K1 parameter). For example, in examples in which the UE 105 may provide feedback in a U slot in the third half-frame according to a configured K1 or similar parameter, the UE 105 may transmit a HARQ ACK communication in a U slot in the third half-frame, as indicated by reference number 155. In such examples, a packet delay associated with the downlink transmission may be equal to, in addition to d0, d1-a as shown in FIG. 1B, with "1" indicative that one retransmission of the downlink transmission was necessary in this example (e.g., the packet delay in this example would be eighteen slots). In examples in which the UE 105 may not provide feedback in a U slot in the third half-frame according to a configured K1 or similar parameter, the UE 105 may transmit a HARQ ACK communication in a U slot in the fourth half-frame, as indicated by reference number 160. In such examples, a packet delay associated with the downlink transmission may be equal, in addition to d0, d1-b shown in FIG. 1B (e.g., the packet delay in this example would be twenty-eight slots).

The UE 105 and the network node 110 may continue in a similar manner until the downlink transmission is safely received and/or until all retransmission opportunities are exhausted (and thus the UE 105 does not ultimately safely receive the transmission). For example, if the first downlink retransmission was not safely received, the UE 105 may provide HARQ NACK feedback in a U slot, such as the first U slot in the third half-frame in the example shown in FIG. 1B, as indicated by reference number 155. In such examples, the network node 110 may retransmit the downlink communication to the UE 105, using a D slot, such as the sixth D slot in the third half-frame in the example shown in FIG. 1B, as indicated by reference number 165. If the UE 105 safely receives the second downlink retransmission, the UE 105 may provide HARQ ACK feedback in an available U slot (e.g., a slot indicated according to a configured K1 parameter), such as a U slot in the fourth half-frame, as indicated by reference number 160. In such examples, a packet delay associated with the downlink transmission may be equal to, in addition to d0 plus d1-a, d2 as shown in FIG. 1B (e.g., the packet delay in this example would be twenty-eight slots).

FIG. 1C shows example packet delays associated with uplink transmissions. In some examples, a packet delay corresponding to an uplink transmission may be associated with a duration between a time at which the UE 105 transmits a buffer status report (BSR) to the network node 110 indicating that the UE 105 has data to transmit, and a time at which an uplink communication (or a retransmission thereof, when a first transmission is not safely received) is transmitted by the UE 105 to the network node 110 and safely received by the network node 110.

In that regard, d0 in FIG. 1C may represent a packet delay associated with an uplink transmission for which an initial transmission is safely received by the network node 110 (e.g., a transmission for which no retransmissions are necessary). More particularly, as indicated by reference number 175, the UE 105 may transmit, and the network node 110 may receive, a BSR in the first U slot of the first half-frame. In some examples, upon receiving the BSR, the network node 110 may schedule uplink resources for use by the UE 105 to transmit the uplink transmission. For example, as indicated by reference number 180, the network node 110 may schedule the first U slot in the second half-frame for transmitting the uplink communication, or the network node may schedule the first U slot in the third half-frame for transmitting the uplink communication. If the uplink communication is safely received by the network node 110 (e.g., if no retransmission of the uplink communication is necessary), a packet delay associated with the uplink communication may thus be equal to the time period indicated by do in FIG. 1C (with "0" indicative that zero retransmissions of the communication were necessary). For example, when the uplink communication is scheduled in the second half-frame, the packet delay may be associated with ten slots, as indicated by the delay labeled do-a in FIG. 1C, and when the uplink communication is scheduled in the third half-frame, the packet delay may be associated with twenty slots, as indicated by the delay labeled d0-b in FIG. 1C.

In examples in which the network node 110 does not safely receive the initial uplink transmission, the network node 110 may feedback "NACK" in a D slot. In such examples, the UE 105 may retransmit the uplink communication in a U slot scheduled for a retransmission. For example, as indicated by reference number 185, the network node 110 may schedule the first U slot in the third half-frame for retransmitting the uplink communication, or the network node may schedule the first U slot in the fourth half-frame for retransmitting the uplink communication. In some examples, if the first uplink retransmission is safely received by the network node 110, the packet delay associated with the communication may be equal to, in addition to do, the time period indicated by d1 in FIG. 1C (with "1" indicative in this example that one retransmission of the communication was necessary). For example, when the uplink communication is scheduled for retransmission in the third half-frame, the packet delay may be associated with twenty slots, as indicated by the delay labeled d1-a in FIG. 1C, and when the uplink communication is scheduled for retransmission in the fourth half-frame, the packet delay may be associated with thirty slots, as indicated by the delay labeled d1-b in FIG. 1C.

In this regard, tracking packet delays at the network node 110 may be complex and may consume large amounts of computations and memory resources at the network node 110. In some implementations, in order to reduce power, computing, and/or network resource consumption associated with tracking packet delays while still maintaining robust communication links, a network node 110 may employ an empirical packet delay measurement, in which packet delay may be estimated or predicted based on PMs already collected by the network node 110, such as a number of HARQ retransmissions associated with a packet or a similar PM count. Aspects of an empirical packet delay measurement are described in more detail below in connection with FIGS. 2A-6.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

FIGS. 2A-2G are diagrams of an example 200 associated with estimating a packet delay measurement. As shown in FIGS. 2A-2G, example 200 includes the UE 105 and the network node 110.

As shown in FIG. 2A, and as indicated by reference number 205, the network node 110 and UE 105 may communicate via a communication link (e.g., communication link 120). In that regard, the communication link may include an uplink (e.g., uplink 125) used to transmit uplink communications from the UE 105 to the network node 110, and a downlink (e.g., downlink 130) used to transmit downlink communications from the network node 110 to the UE 105. In some implementations, the communication link may be associated with TDD pattern, such as the TDD frame structure 135 described above in connection with FIGS. 1B-1C. In such implementations, the UE 105 may be scheduled to transmit uplink communications (e.g., uplink control messages, data messages, HARQ ACK/NACK feedback, or similar communications) in U slots, and/or the network node 110 may transmit downlink communications (e.g., downlink control messages, data messages, HARQ ACK/NACK feedback, or similar communications) in D slots.

In some implementations, the network node 110 may be configured to estimate multiple packet delay measurements and/or differentiate packet delay estimates, such as by estimating a packet delay for each UE, service type, quality of service (QOS) flow, network slice, bandwidth part, or the like. More particularly, the communication link may be associated with a particular UE (e.g., the UE 105), a particular service type, a particular QoS flow, a particular network slice, or a similar service and/or flow, and the network node 110 may be configured to estimate packet delay measurements for the particular service type, the particular QoS flow, the particular network slice, and/or the similar service and/or flow. In some implementations, the communication link may be associated with a QoS class identifier (QCI), a 5G QoS flow identifier (5QI), a service profile identifier (SPID), a radio access technology (RAT) frequency selection priority (RFSP) index, a single-network slice selection assistance information (S-NSSAI), and/or a public land mobile network (PLMN) identifier, and thus the network node 110 may be configured to estimate packet delay measurements associated with the QCI, 5QI, SPID, RFSP index, S-NSSAI, and/or PLMN identifier.

As shown in FIG. 2B, and as indicated by reference number 210, the network node 110 may collect PMs associated with the communication link between the network node 110 and the UE 105. In some implementations, collecting PMs may include collecting one or more key performance indicators (KPIs) or similar measurements. In some implementations, the PMs may include counts (sometimes referred to herein as PM counts) associated with HARQ retransmissions, such as a number of packets and/or a volume of data associated with each of multiple HARQ retransmission groups and/or categories. For example, a first HARQ retransmission group or category may be associated with zero HARQ retransmissions (e.g., communications for which an initial transmission was successfully received and thus no retransmissions were necessary), a second HARQ retransmission group or category may be associated with one HARQ retransmission (e.g., the first downlink retransmission described above in connection with reference number 150 and/or the uplink retransmission described above in connection with reference number 185), a third HARQ retransmission group or category may be associated with two HARQ retransmissions, and so forth. In that regard, for a given UE 105, flow, communication link, or the like, the PM counts may indicate a total number of packets associated with each HARQ retransmission group, of multiple HARQ retransmission groups associated with the communication link, and/or a total data volume associated with each HARQ retransmission group, of the multiple HARQ retransmission groups associated with the communication link.

Figure 2C:
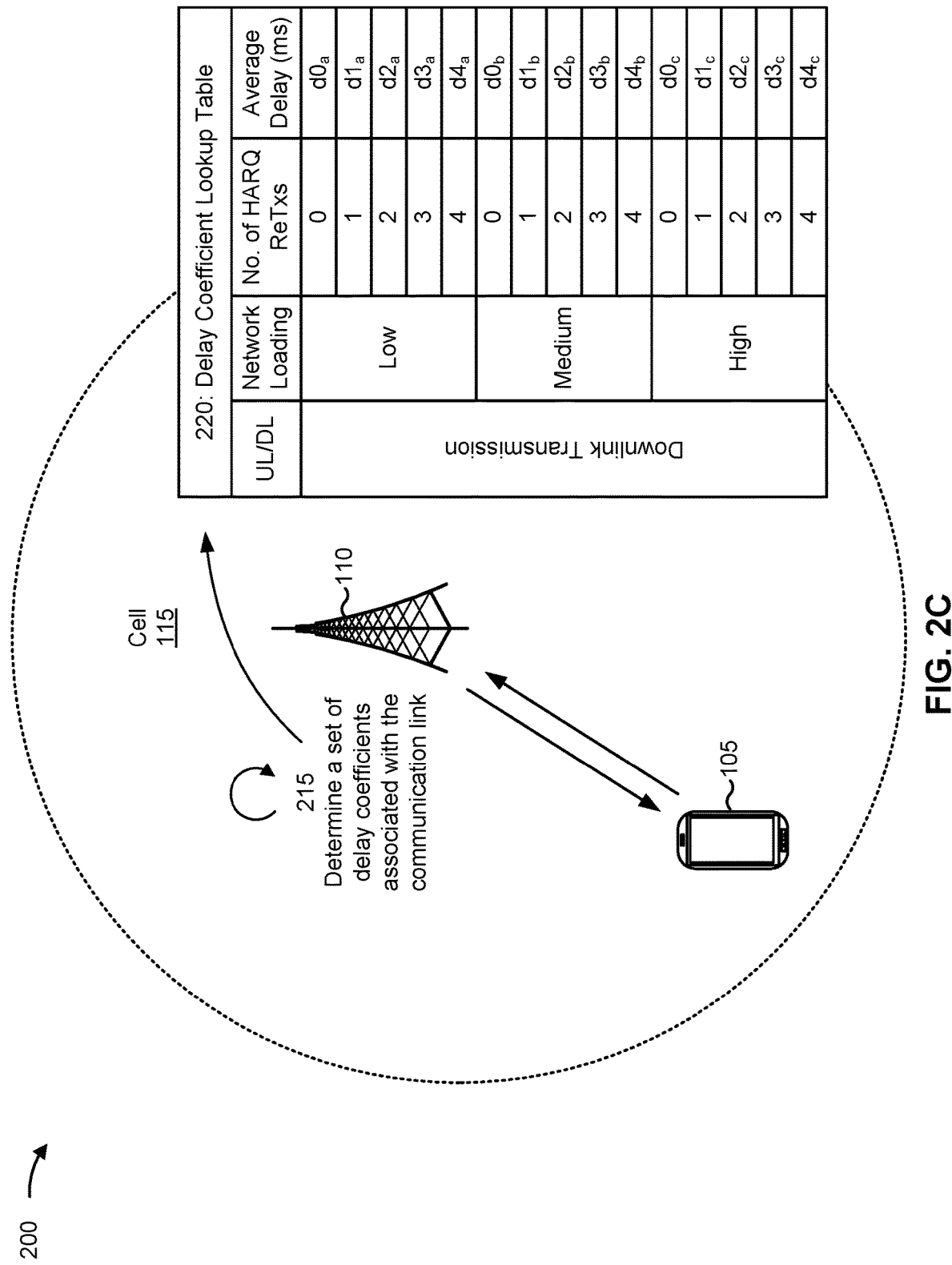
Figure 2D:
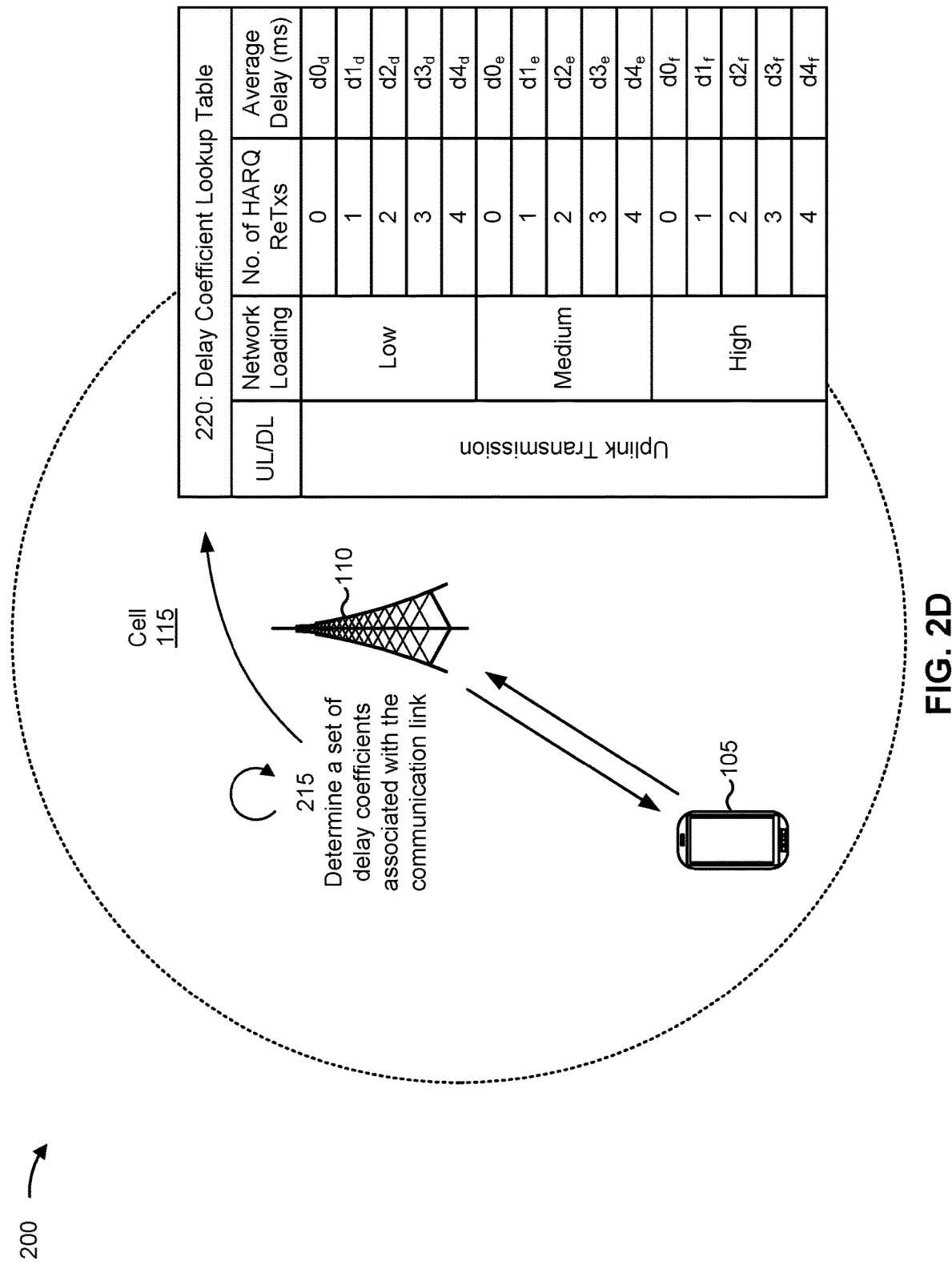

As shown in FIGS. 2C and 2D, and as indicated by reference number 215, in some implementations the network node 110 may determine a set of delay coefficients associated with the communication link (e.g., the network node 110 may determine a set of delay coefficients associated with a QCI, a 5QI, a SPID, an RFSP index, S-NSSAI, and/or a PLMN identifier associated with the communication link). In some implementations, the delay coefficients may be associated with an average packet delay associated with each of the HARQ retransmission groups and/or categories. For example, as described above in connection with FIGS. 1B and 1C, packet delays corresponding to each number of HARQ retransmissions may vary based on network scheduling, communication parameters (e.g., a configured K1 parameter), and other factors. More particularly, as described in connection with the example shown in FIG. 1C, the packet delay associated with a packet retransmitted one time by the UE 105 may vary between d0 plus one of d1-a or d1-b, among other examples. Similarly, as described in connection with the example shown in FIG. 1B, the packet delay associated with a packet that requires no retransmissions by the network node 110 may vary between d0-a and d0-b, and/or the packet delay associated with a packet retransmitted one time by the network node 110 may vary between d0-a plus d1-a or d0-b plus d1-b, among other examples. Accordingly, in some implementations, each delay coefficient may be associated with an average packet delay value for a corresponding HARQ retransmission group. For example, a delay coefficient associated with a first HARQ retransmission group (e.g., packets that do not require a HARQ retransmission) may be referred to as d0, which may represent an average value of the corresponding delay values described above in connection with FIGS. 1B and 1C. Similarly, a delay coefficient associated with a second HARQ retransmission group (e.g., packets that require one HARQ retransmission) may be referred to as d1, which may represent an average value of the corresponding delay values described above in connection with FIGS. 1B and 1C, and so forth. In some implementations, the delay coefficients may be empirically determined, such as by measuring a threshold number of packet delays for each HARQ category and determining an average (e.g., mean) value of the threshold number of packet delays.

In some implementations, the delay coefficients may be associated with a lookup table or similar data structure, such as the lookup table 220 shown in FIGS. 2C and 2D. The lookup table 220 may include multiple sets of delay coefficients associated with different network settings and/or link directions (e.g., downlink or uplink). For example, as shown in FIG. 2C, the lookup table 220 may include multiple sets of delay coefficients associated with downlink transmissions, with each set of delay coefficients associated with a different network loading level. More particularly, the lookup table 220 may include a first set of delay coefficients for downlink transmissions (indicated in FIG. 2C as $d0_a$, $d1_a$, $d2_a$, $d3_a$, and $d4_a$, sometimes referred to herein as the "a-set" of coefficients, which correspond to zero, one, two, three, and four HARQ retransmissions, respectively), which may be associated with a first network loading level (e.g., a low network loading level, which may correspond to a loading level being below a first loading threshold). The lookup table 220 may include a second set of delay coefficients for downlink transmissions (indicated in FIG. 2C as $d0_b$, $d1_b$, $d2_b$, $d3_b$, and $d4_b$, sometimes referred to herein as the "b-set" of coefficients, which correspond to zero, one, two, three, and four HARQ retransmissions, respectively), which may be associated with a second network loading level (e.g., a medium network loading level, which may correspond to a loading level being above the first loading threshold and below a second loading threshold). The lookup table 220 may include a third set of delay coefficients for downlink transmissions (indicated in FIG. 2C as $d0_c$, $d1_c$, $d2_c$, $d3_c$, and $d4_c$, sometimes referred to herein as the "c-set" of coefficients, which correspond to zero, one, two, three, and four HARQ retransmissions, respectively), which may be associated with a third network loading level (e.g., a high network loading level, which may correspond to a loading level being above the second loading threshold).

Moreover, as shown in FIG. 2D, the lookup table 220 may also include multiple sets of delay coefficients associated with uplink transmissions, with each set of delay coefficients associated with a different network loading level. More particularly, the lookup table 220 may include a first set of delay coefficients for uplink transmissions (indicated in FIG. 2D as $d0_d$, $d1_d$, $d2_d$, $d3_d$, and $d4_d$, sometimes referred to herein as the "d-set" of coefficients, which correspond to zero, one, two, three, and four HARQ retransmissions, respectively), which may be associated with the first network loading level (e.g., the low network loading level). The lookup table 220 may include a second set of delay coefficients for uplink transmissions (indicated in FIG. 2D as $d0_e$, $d1_e$, $d2_e$, $d3_e$, and $d4_e$, sometimes referred to herein as the "e-set" of coefficients, which correspond to zero, one, two, three, and four HARQ retransmissions, respectively), which may be associated with the second network loading level (e.g., the medium network loading level). The lookup table 220 may include a third set of delay coefficients for uplink transmissions (indicated in FIG. 2D as $d0_f$, $d1_f$, $d2_f$, $d3_f$, and $d4_f$, sometimes referred to herein as the "f-set" of coefficients, which correspond to zero, one, two, three, and four HARQ retransmissions, respectively), which may be associated with the third network loading level (e.g., the high network loading level).

In such implementations, determining the set of delay coefficients associated with the communication link may include the network node 110 selecting the set of delay coefficients from multiple sets of delay coefficients based on a link direction (e.g., uplink or downlink) for which a packet delay is being estimated and/or based on a corresponding network loading level (e.g., low, medium, or high). For example, in implementations in which the network node 110 is to estimate a packet delay associated with a downlink transmission during a low network loading, the network node 110 may select the a-set of coefficients. In implementations in which the network node 110 is to estimate a packet delay associated with a downlink transmission during a medium network loading, the network node 110 may select the b-set of coefficients. In implementations in which the network node 110 is to estimate a packet delay associated with a downlink transmission during a high network loading, the network node 110 may select the c-set of coefficients. In implementations in which the network node 110 is to estimate a packet delay associated with an uplink transmission during a low network loading, the network node 110 may select the d-set of coefficients. In implementations in which the network node 110 is to estimate a packet delay associated with an uplink transmission during a medium network loading, the network node 110 may select the e-set of coefficients. In implementations in which the network node 110 is to estimate a packet delay associated with an uplink transmission during a high network loading, the network node 110 may select the f-set of coefficients. In some other implementations, such as implementations employing artificial intelligence (AI)/machine learning (ML), which is described in more detail in connection with FIGS. 2F and 2G, the network node 110 may omit the operations described above in connection with reference number 215.

Figure 2E:
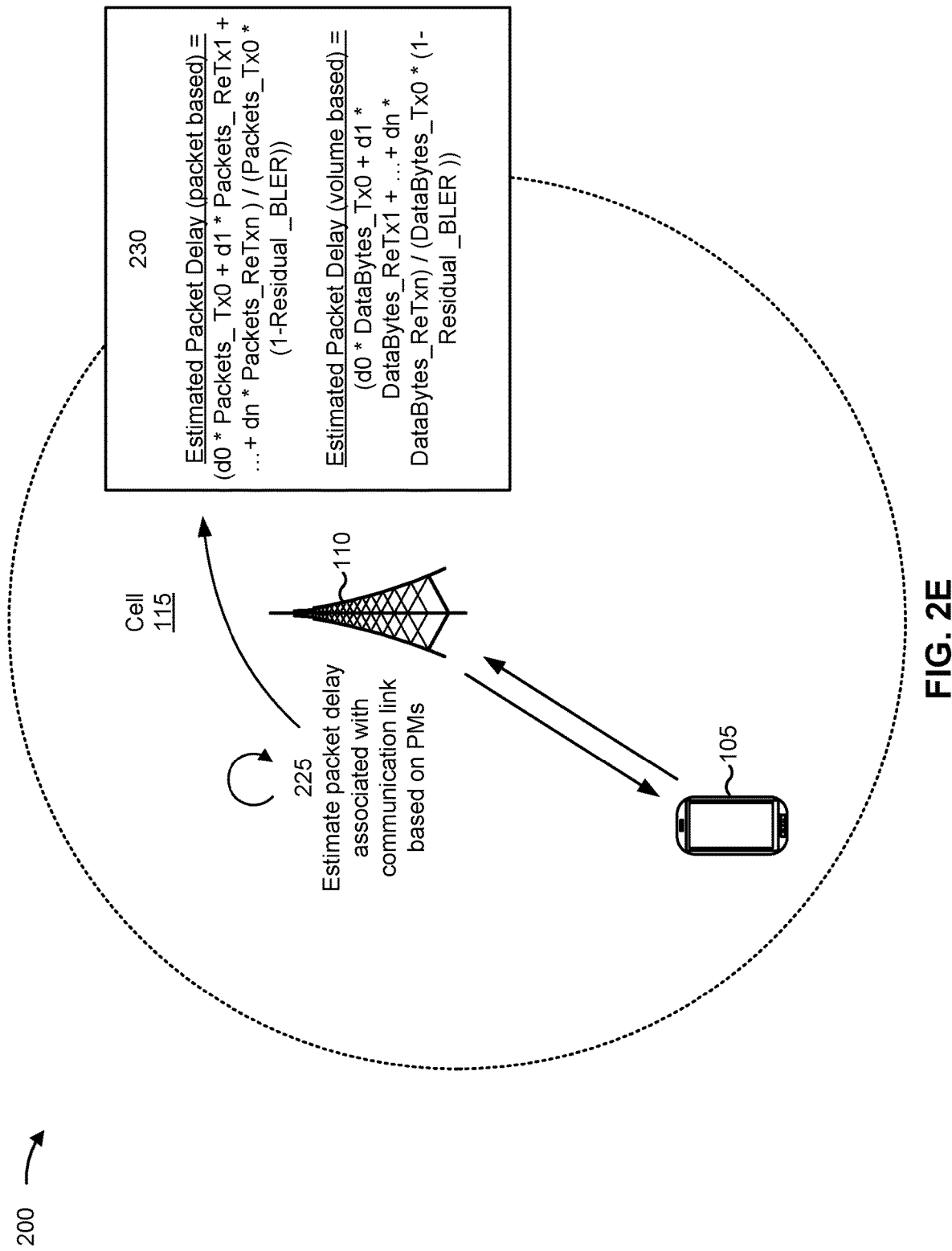

As shown in FIG. 2E, and as indicated by reference number 225, the network node 110 may estimate a packet delay associated with the communication link based on the PMs. In some implementations, estimating the packet delay associated with the communication link may include estimating a packet delay for a particular UE, flow, service, slice, or similar differentiated network flow, such as for a UE-specific flow, a class identified by a QCI, a flow identified by a 5QI, a service identified by an SPID, a frequency band identified by a RFSP index, a network slice identified by a S-NSSAI, a network identified by a PLMN identifier, or the like.

In some implementations, such as implementations in which the network node 110 determines a set of delay coefficients associated with the communication link (as described above in connection with reference number 215), the network node 110 may estimate the packet delay associated with the communication link based on the set of delay coefficients. For example, as described above in connection with the lookup table 220, each delay coefficient may be associated with a corresponding HARQ retransmission group (e.g., a number of HARQ retransmissions). More particularly, d0 from each set of delay coefficients may be associated with zero HARQ retransmissions (e.g., packets that did not require retransmission), d1 from each set of delay coefficients may be associated with one HARQ retransmissions (e.g., packets that required one retransmission), and so forth. More generally, dn from each set of delay coefficients may be associated with n HARQ retransmissions.

In such implementations, the network node 110 may estimate a packet delay based on a weighted average of the delay coefficients. For example, as shown by reference number 230 in FIG. 2E, in some implementations (e.g., packet-based implementations) the network node 110 may estimate the packet delay based on a sum of products of the total number of packets associated with each HARQ retransmission group (sometimes referred to as Packets_ReTxn, with n corresponding to the number of HARQ retransmissions, or else Packets_Tx0, corresponding to a number of initially transmitted packets) and the corresponding delay coefficient (e.g., dn or d0), divided by a product of a total number of transmitted packets (e.g., Packets_Tx0) and one minus a residual block error rate (BLER) (sometimes referred to as Residual_BLER). Put another way, in packet-based calculations, the network node 110 may estimate the packet delay as (d0×Packets_Tx0+d1×Packets_ReTx1+ . . . +dn×Packets_ReTxn)/(Packets_Tx0×(1−Residual_BLER).

In some other implementations, (e.g., volume-based implementations) the network node 110 may estimate the packet delay based on a sum of products of the total data volume associated with each HARQ retransmission group (sometimes referred to as DataBytes_ReTxn, with n corresponding to the number of HARQ retransmissions, or else DataBytes_Tx0, corresponding to a data volume initially transmitted) and the corresponding delay coefficient (e.g., dn or d0), divided by the product of a total data volume transmitted (sometimes referred to as DataBytes_Tx0) and one minus the residual BLER (e.g., Residual_BLER). Put another way, in packet-based calculations, the network node 110 may estimate the packet delay as (d0×DataBytes_Tx0+d1×DataBytes_ReTx1+ . . . +dn×DataBytes_ReTxn)/(DataBytes_Tx0×(1−Residual_BLER)).

Figure 2F:
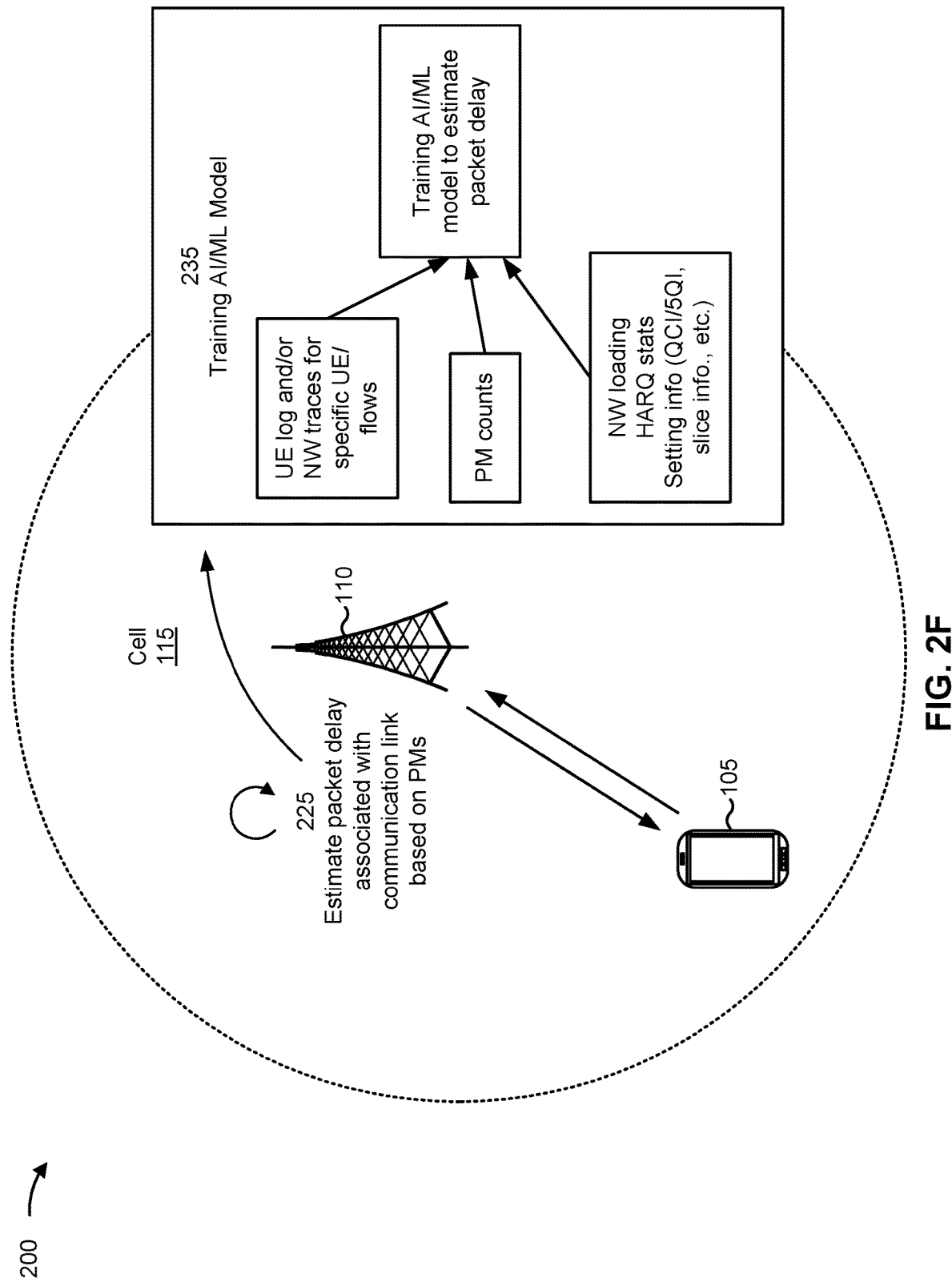
Figure 2G:
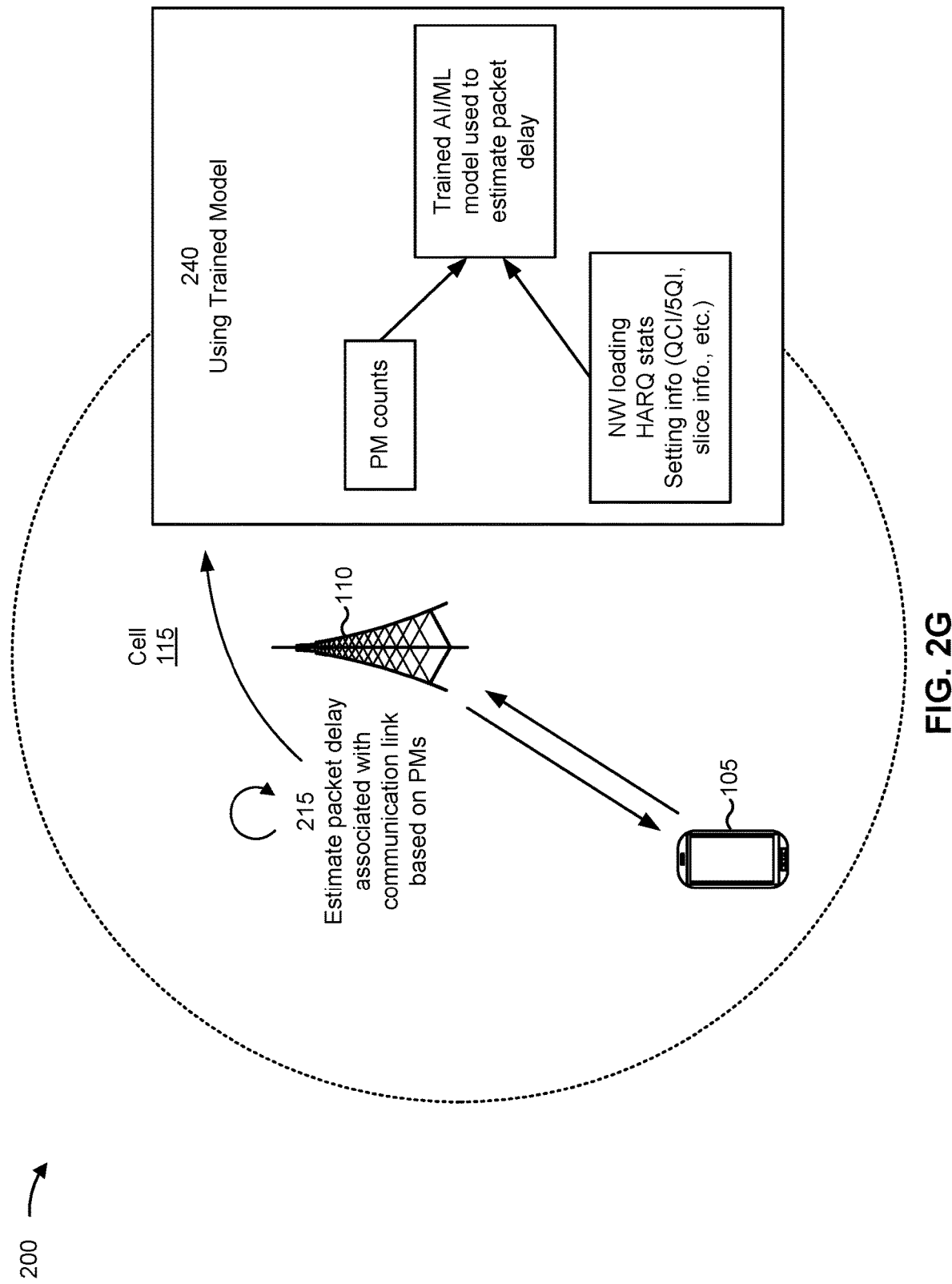

In some other implementations, as shown in FIGS. 2F and 2G, the network node 110 may estimate the packet delay associated with the communication link using a machine learning model. For example, the machine learning model may be based on the PM counts, a network loading level associated with the communication link, HARQ statistics associated with the communication link, setting information associated with the communication link (e.g., QCI, 5QI, slice information, or the like), and/or similar inputs, and the machine learning model may estimate and/or predict the packet delay accordingly.

As shown in FIG. 2F, and as indicated by reference number 235, in some implementations the network node 110 may train the machine learning model based on measured packet delays. More particularly, the network node 110 may measure and/or receive packet delay metrics associated with the communication link (e.g., from UE logs and/or network node traces associated with specific UEs, flows, services, slices, or the like), determine a network loading level associated with the communication link during measuring of the packet delay metrics and/or similar information (e.g., HARQ statistics, setting information, or the like). Accordingly, the network node 110 and/or a machine learning system associated with the network node 110 (described in more detail below in connection with FIG. 3) may train the machine learning model based on the PM counts, the packet delay metrics, the network loading level, or similar information.

As shown in FIG. 2G and as indicated by reference number 240, the network node 110 may then use the trained machine learning model to estimate and/or predict a packet delay associated with the communication link. For example, based on PM counts (e.g., a number of packets and/or an amount of data associated with each HARQ retransmission group), a network loading level, HARQ statistics, setting information, and/or similar information, the machine learning model may estimate and/or predict a packet delay associated with the communication link without requiring resource-intensive packet delay measurements. Accordingly, estimating the packet delay measurements may reduce power, computation, and memory resource consumption as compared to performing actual packet delay measurements, while providing flexibility to quickly adapt communication links, thereby reducing communication errors, increasing throughput in a communication link, and reducing latency in a communication link. Additional aspects of using a machine learning model to estimate and/or predict packet delay in a communication link are described in more detail below in connection with FIG. 3.

As indicated above, FIGS. 2A-2G are provided as an example. Other examples may differ from what is described with regard to FIGS. 2A-2G. The number and arrangement of devices shown in FIGS. 2A-2G are provided as an example. In practice, there may be additional devices, fewer devices, different devices, or differently arranged devices than those shown in FIGS. 2A-2G. Furthermore, two or more devices shown in FIGS. 2A-2G may be implemented within a single device, or a single device shown in FIGS. 2A-2G may be implemented as multiple, distributed devices. Additionally, or alternatively, a set of devices (e.g., one or more devices) shown in FIGS. 2A-2G may perform one or more functions described as being performed by another set of devices shown in FIGS. 2A-2G.

Figure 3:
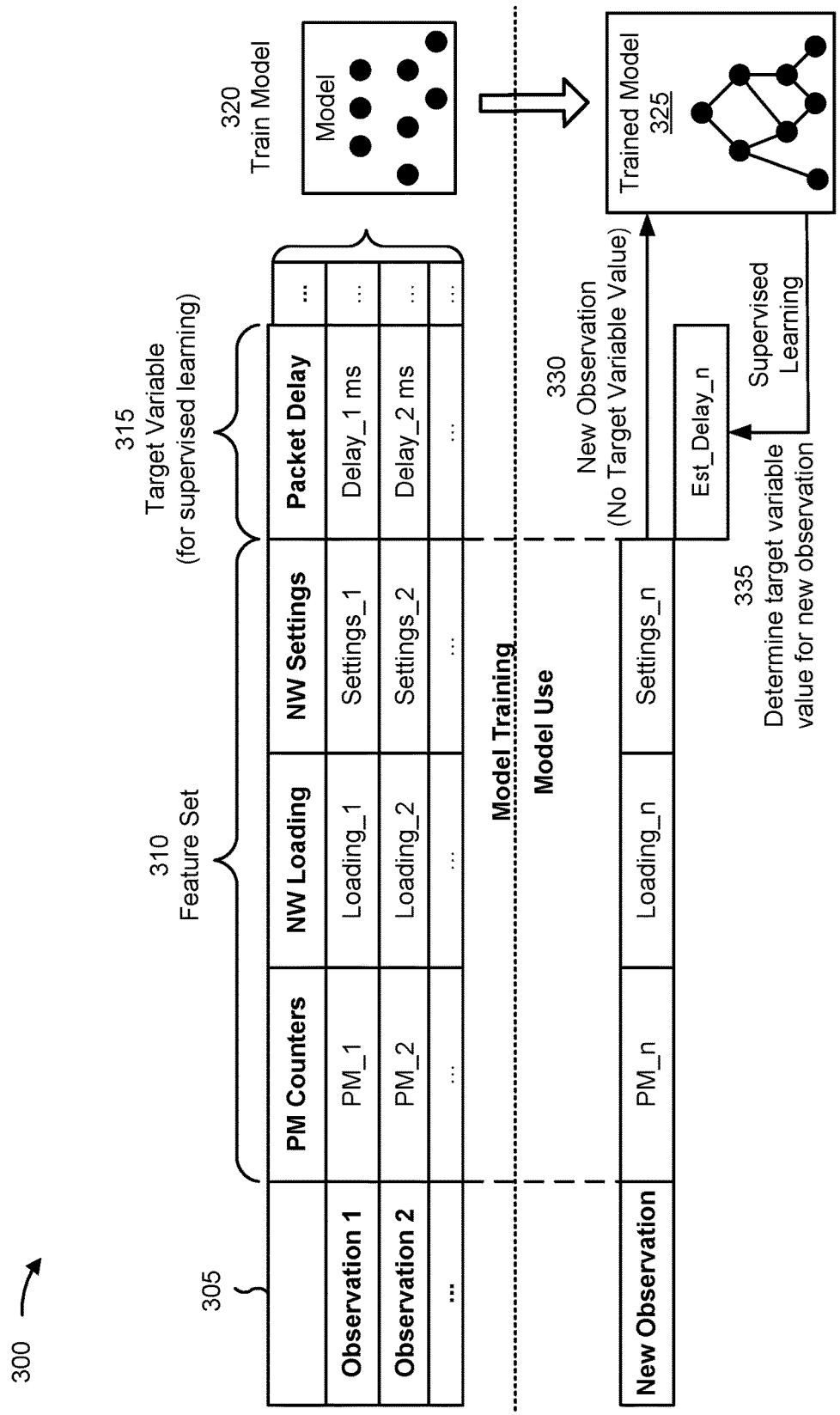
FIG. 3 is a diagram illustrating an example of training and using a machine learning model in connection with systems and methods for estimating a packet delay measurement.

FIG. 3 is a diagram illustrating an example 300 of training and using a machine learning model in connection with systems and methods for estimating a packet delay measurement. The machine learning model training and usage described herein may be performed using a machine learning system. The machine learning system may include or may be included in a computing device, a server, a cloud computing environment, or the like, such as the network node 110, a core network device, a data network device, or a similar device described in more detail elsewhere herein.

As shown by reference number 305, a machine learning model may be trained using a set of observations. The set of observations may be obtained from training data (e.g., historical data), such as data gathered during one or more processes described herein. In some implementations, the machine learning system may receive the set of observations (e.g., as input) from the UE 105, the network node 110, a core network device, a data network device, or a similar device, as described elsewhere herein.

As shown by reference number 310, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the UE 105, the network node 110, a core network device, a data network device, or a similar device. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of PM counters, a second feature of a network loading level, a third feature of one or more network settings, and so on. As shown, for a first observation, the first feature may have a value of PM_1 (e.g., a first set of a number of packets and/or data volume associated with each HARQ retransmission group), the second feature may have a value of Loading_1 (e.g., a corresponding network loading level when the PM counts were collected, such as one of a low network loading level, a medium network loading level, or a high network loading level), the third feature may have a value of Settings_1 (e.g., one or more corresponding network settings when the PM counts were collected, such as service or slice information, HARQ statistics, or similar information), and so on. These features and feature values are provided as examples, and may differ in other examples.

As shown by reference number 315, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 300, the target variable is a packet delay, which has a value of Delay_1 milliseconds (ms) for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 320, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 325 to be used to analyze new observations.

As an example, the machine learning system may obtain training data for the set of observations based on measuring packet delays, such as the packet delays described above in connection with FIGS. 1B and 1C. More particularly, the machine learning system may measure packet delays for a variety of PM counts, network loading levels, communication settings and/or parameters, or similar variables. Based on a machine learning algorithm, such as a regression algorithm, a decision tree algorithm, a neural network algorithm, a k-nearest neighbor algorithm, a support vector machine algorithm, or a similar algorithm, the machine learning system may train the machine learning model to predict a packet delay based on PM counts, network loading levels, communication settings and/or parameters, or similar variables.

As shown by reference number 330, the machine learning system may apply the trained machine learning model 325 to a new observation, such as by receiving a new observation and inputting the new observation to the trained machine learning model 325. As shown, the new observation may include a first feature of PM counts (e.g., PM_n), a second feature of a network loading level (e.g., Loading_n), a third feature of one or more network settings (e.g., Settings_n), and so on, as an example. The machine learning system may apply the trained machine learning model 325 to the new observation to generate an output (e.g., a result). The type of output may depend on the type of machine learning model and/or the type of machine learning task being performed. For example, the output may include a predicted value of a target variable (e.g., a predicted packet delay), such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 325 may predict a packet delay (e.g., Est_Delay_n) for the target variable for the new observation, as shown by reference number 335. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation or automated action may include, for example, a recommendation or action to change one or more communication parameters (e.g., a data rate, a modulation and coding scheme (MCS), a beam and/or transmission configuration indictor (TCI) state, or a similar communication parameter) in order to reduce packet delay, a recommendation or action to prioritize certain traffic or flows based on the packet delay, or similar recommendations or actions.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 325 may be re-trained using feedback information. For example, feedback may be provided to the machine learning model. The feedback may be associated with actions performed based on the recommendations provided by the trained machine learning model 325 and/or automated actions performed, or caused, by the trained machine learning model 325. In other words, the recommendations and/or actions output by the trained machine learning model 325 may be used as inputs to re-train the machine learning model (e.g., a feedback loop may be used to train and/or update the machine learning model).

In this way, the machine learning system may apply a rigorous and automated process to estimate a packet delay associated with a communication link. The machine learning system may enable recognition and/or identification of tens, hundreds, thousands, or millions of features and/or feature values for tens, hundreds, thousands, or millions of observations, thereby increasing accuracy and consistency and reducing delay associated with estimating a packet delay associated with a communication link relative to requiring computing resources to be allocated for tens, hundreds, or thousands of operators to manually estimate a packet delay associated with a communication link using the features or feature values.

As indicated above, FIG. 3 is provided as an example. Other examples may differ from what is described in connection with FIG. 3.

Figure 4:
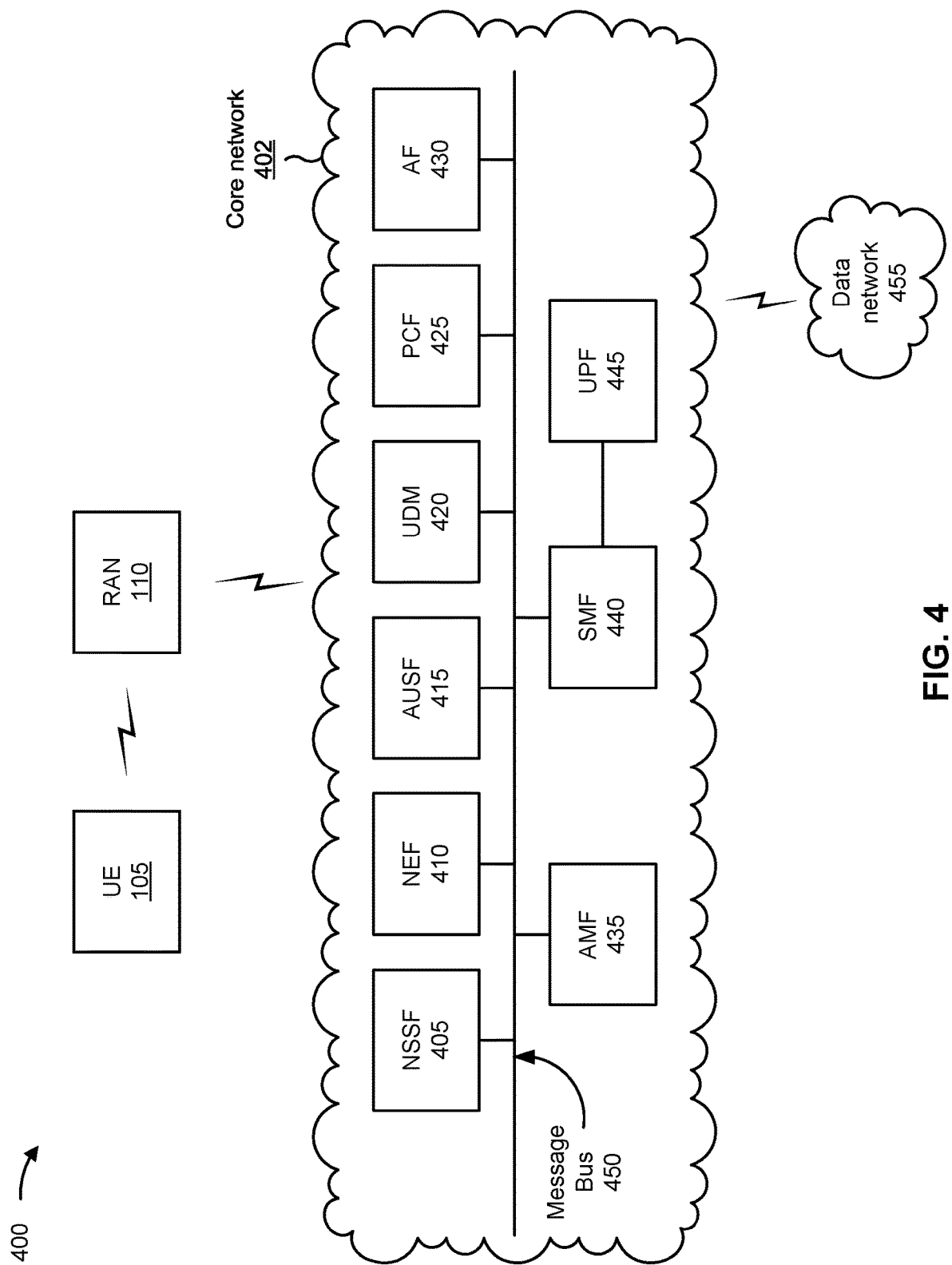
FIG. 4 is a diagram of an example environment in which systems and/or methods described herein may be implemented.

FIG. 4 is a diagram of an example environment 400 in which systems and/or methods described herein may be implemented. As shown in FIG. 4, example environment 400 may include a UE 105, a network node 110 (e.g., a RAN device), a core network 402, and a data network 455. Devices and/or networks of example environment 400 may interconnect via wired connections, wireless connections, or a combination of wired and wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The network node 110 (e.g., RAN) may support, for example, a cellular RAT. The network node 110 may include one or more base stations (e.g., base transceiver stations, radio base stations, node Bs, eNBs, gNBs, CUs, DUs, RUs, base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 105. The network node 110 may transfer traffic between the UE 105 (e.g., using a cellular RAT), one or more base stations (e.g., using a wireless interface or a backhaul interface, such as a wired backhaul interface), and/or the core network 402. The network node 110 may provide one or more cells that cover geographic areas (e.g., cell 115).

In some implementations, the network node 110 may perform scheduling and/or resource management for the UE 105 covered by the network node 110 (e.g., the UE 105 covered by the cell 115 provided by the network node 110). In some implementations, the network node 110 may be controlled or coordinated by a network controller, which may perform load balancing, network-level configuration, and/or other operations. The network controller may communicate with the network node 110 via a wireless or wireline backhaul. In some implementations, the network node 110 may include a network controller, a self-organizing network (SON) module or component, or a similar module or component. In other words, the network node 110 may perform network control, scheduling, and/or network management functions (e.g., for uplink, downlink, and/or sidelink communications of the UE 105 covered by the network node 110).

In some implementations, the core network 402 may include an example functional architecture in which systems and/or methods described herein may be implemented. For example, the core network 402 may include an example architecture of a 5G next generation (NG) core network included in a 5G wireless telecommunications system. While the example architecture of the core network 402 shown in FIG. 2 may be an example of a service-based architecture, in some implementations, the core network 402 may be implemented as a reference-point architecture and/or a 4G core network, among other examples.

As shown in FIG. 4, the core network 402 may include a number of functional elements. The functional elements may include, for example, a network slice selection function (NSSF) 405, a network exposure function (NEF) 410, an authentication server function (AUSF) 415, a unified data management (UDM) component 420, a policy control function (PCF) 425, an application function (AF) 430, an access and mobility management function (AMF) 435, a session management function (SMF) 440, and/or a user plane function (UPF) 445. These functional elements may be communicatively connected via a message bus 450. Each of the functional elements shown in FIG. 4 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 405 includes one or more devices that select network slice instances for the UE 105. By providing network slicing, the NSSF 405 allows an operator to deploy multiple substantially independent end-to-end networks potentially with the same infrastructure. In some implementations, each slice may be customized for different services.

The NEF 410 includes one or more devices that support exposure of capabilities and/or events in the wireless telecommunications system to help other entities in the wireless telecommunications system discover network services.

The AUSF 415 includes one or more devices that act as an authentication server and support the process of authenticating the UE 105 in the wireless telecommunications system.

The UDM 420 includes one or more devices that store user data and profiles in the wireless telecommunications system. The UDM 420 may be used for fixed access and/or mobile access in the core network 402.

The PCF 425 includes one or more devices that provide a policy framework that incorporates network slicing, roaming, packet processing, and/or mobility management, among other examples.

The AF 430 includes one or more devices that support application influence on traffic routing, access to the NEF 410, and/or policy control, among other examples.

The AMF 435 includes one or more devices that act as a termination point for non-access stratum (NAS) signaling and/or mobility management, among other examples.

The SMF 440 includes one or more devices that support the establishment, modification, and release of communication sessions in the wireless telecommunications system. For example, the SMF 440 may configure traffic steering policies at the UPF 445 and/or may enforce user equipment Internet Protocol (IP) address allocation and policies, among other examples.

The UPF 445 includes one or more devices that serve as an anchor point for intraRAT and/or interRAT mobility. The UPF 445 may apply rules to packets, such as rules pertaining to packet routing, traffic reporting, and/or handling user plane QoS, among other examples.

The message bus 450 represents a communication structure for communication among the functional elements. In other words, the message bus 450 may permit communication between two or more functional elements.

The data network 455 includes one or more wired and/or wireless data networks. For example, the data network 455 may include an IP Multimedia Subsystem (IMS), a PLMN, a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of example environment 400 may perform one or more functions described as being performed by another set of devices of example environment 400.

Figure 5:
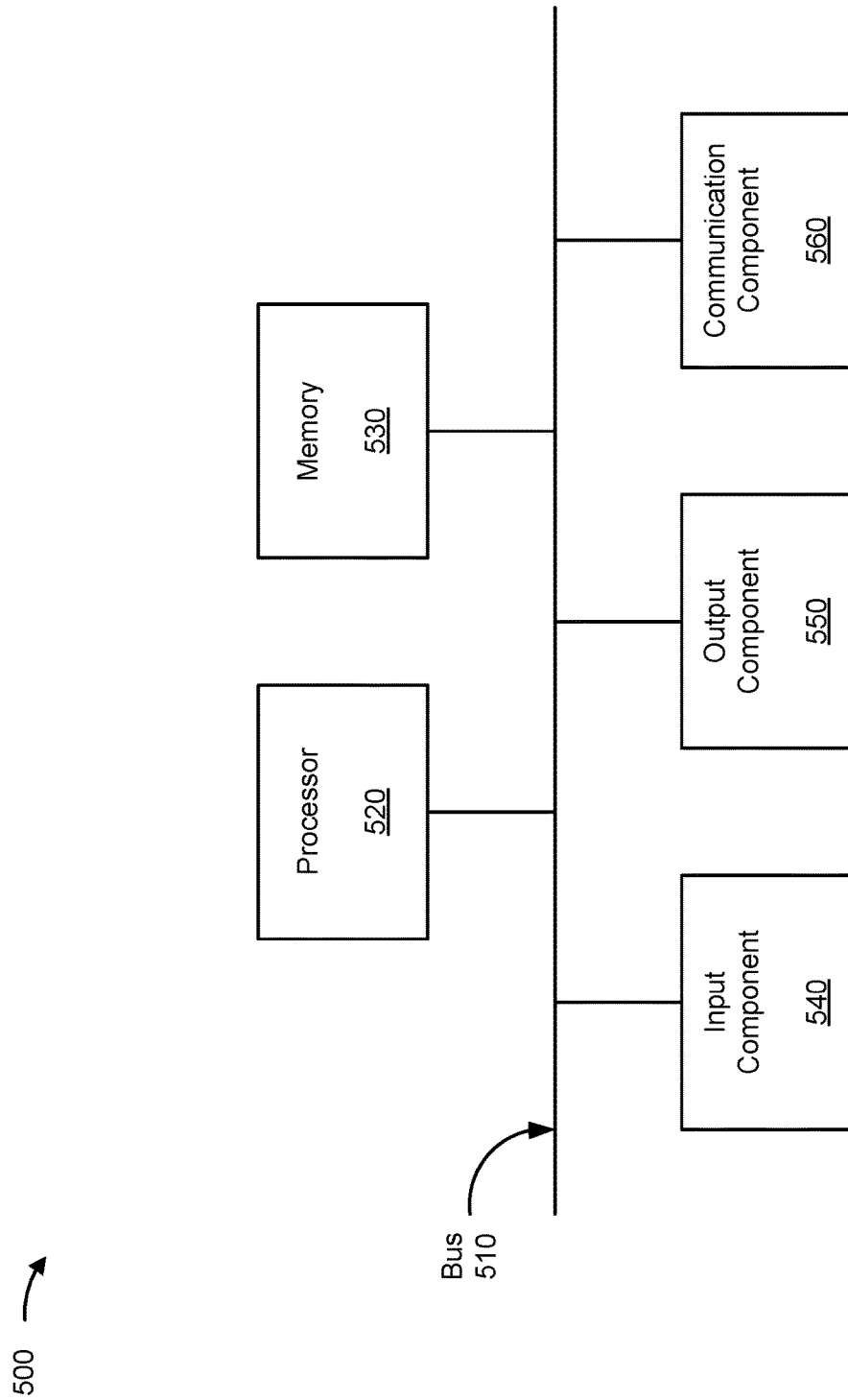
FIG. 5 is a diagram of example components of a device associated with estimating a packet delay measurement.

FIG. 5 is a diagram of example components of a device 500 associated with estimating a packet delay measurement. The device 500 may correspond to the UE 105, the network node 110, the core network 402 and/or a device thereof, and/or the data network 455. In some implementations, the UE 105, the network node 110, the core network 402 and/or a device thereof, and/or the data network 455 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
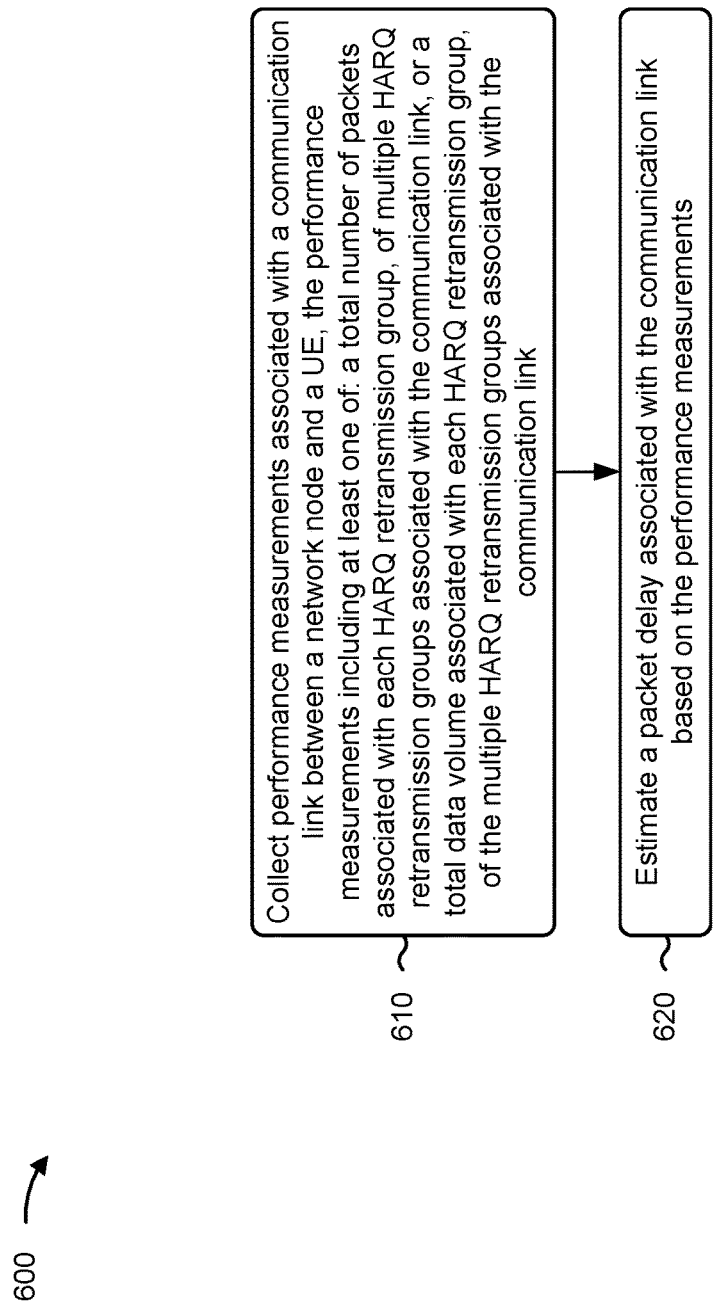
FIG. 6 is a flowchart of an example process associated with estimating a packet delay measurement.

FIG. 6 is a flowchart of an example process 600 associated with estimating a packet delay measurement. In some implementations, one or more process blocks of FIG. 6 may be performed by a network node (e.g., network node 110). In some implementations, one or more process blocks of FIG. 6 may be performed by another device or a group of devices separate from or including the network node, such as a UE (e.g., the UE 105), a core network device (e.g., a device associated with the core network 402), and/or a data network device (e.g., a device associated with the data network 455). Additionally, or alternatively, one or more process blocks of FIG. 6 may be performed by one or more components of device 500, such as processor 520, memory 530, input component 540, output component 550, and/or communication component 560.

As shown in FIG. 6, process 600 may include collecting performance measurements associated with a communication link between a network node and a UE, the performance measurements including at least one of: a total number of packets associated with each HARQ retransmission group, of multiple HARQ retransmission groups associated with the communication link, or a total data volume associated with each HARQ retransmission group, of the multiple HARQ retransmission groups associated with the communication link, as described above (block 610). For example, the network node may collect performance measurements associated with a communication link between a network node and a user equipment, the performance measurements including at least one of: a total number of packets associated with each HARQ retransmission group, of multiple HARQ retransmission groups associated with the communication link, or a total data volume associated with each HARQ retransmission group, of the multiple HARQ retransmission groups associated with the communication link, as described above. In some implementations, the communication link is associated with at least one of a quality of service class identifier, a 5G quality of service flow identifier, a service profile identifier, a radio access technology frequency selection priority index, single-network slice selection assistance information, or a public land mobile network identifier.

As further shown in FIG. 6, process 600 may include estimating a packet delay associated with the communication link based on the performance measurements (block 620). For example, the network node may estimate a packet delay associated with the communication link based on the performance measurements, as described above. In some implementations, process 600 includes determining a set of delay coefficients associated with the communication link, wherein estimating the packet delay associated with the communication link includes estimating the packet delay associated with the communication link based on the set of delay coefficients. For example, the set of delay coefficients may include, for each HARQ retransmission group, a corresponding delay coefficient, and wherein estimating the packet delay associated with the communication link is based on at least one of a sum of products of the total number of packets associated with each HARQ retransmission group and the corresponding delay coefficient, divided by a product of a total number of transmitted packets and one minus a residual BLER, or a sum of products of the total data volume associated with each HARQ retransmission group and the corresponding delay coefficient, divided by the product of a total data volume transmitted and one minus the residual BLER.

In some implementations, determining the set of delay coefficients associated with the communication link includes selecting the set of delay coefficients from multiple sets of delay coefficients. Additionally, or alternatively, a first set of delay coefficients, of the multiple sets of delay coefficients, may be associated with a first network loading level, and a second set of delay coefficients, of the multiple sets of delay coefficients, may be associated with a second network loading level different from the first network loading level. In some implementations, a first subset of sets of delay coefficients, of the multiple sets of delay coefficients, is associated with uplink communications, and a second subset of sets of delay coefficients, of the multiple sets of delay coefficients, is associated with downlink communications.

In some other implementations, estimating the packet delay associated with the communication link includes using a machine learning model to estimate the packet delay associated with the communication link based on the performance measurements. In such implementations, process 600 may include measuring packet delay metrics associated with the communication link, and training the machine learning model based on the performance measurements and the packet delay metrics, and/or determining a network loading level associated with the communication link, and training the machine learning model based on the performance measurements and the network loading level. In some implementations, the machine learning model is based on at least one of a network loading level associated with the communication link, HARQ statistics associated with the communication link, or setting information associated with the communication link.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
collecting performance measurements associated with a communication link between a network node and a user equipment, the performance measurements including at least one of:
a total number of packets associated with each hybrid automatic repeat request (HARQ) retransmission group, of multiple HARQ retransmission groups associated with the communication link, or
a total data volume associated with each HARQ retransmission group, of the multiple HARQ retransmission groups associated with the communication link;
determining, based on a link direction of the communication link, a set of delay coefficients associated with the communication link; and
estimating a packet delay associated with the communication link based on the performance measurements and the set of delay coefficients.

2. The method of claim 1,
wherein the set of delay coefficients includes, for each HARQ retransmission group, a corresponding delay coefficient, and wherein estimating the packet delay associated with the communication link is based on at least one of:
a sum of products of the total number of packets associated with each HARQ retransmission group and the corresponding delay coefficient, divided by a product of a total number of transmitted packets and one minus a residual block error rate (BLER), or
a sum of products of the total data volume associated with each HARQ retransmission group and the corresponding delay coefficient, divided by the product of a total data volume transmitted and one minus the residual BLER.

3. The method of claim 1,
wherein determining the set of delay coefficients associated with the communication link includes selecting the set of delay coefficients from multiple sets of delay coefficients.

4. The method of claim 3,
wherein a first set of delay coefficients, of the multiple sets of delay coefficients, is associated with a first network loading level, and
wherein a second set of delay coefficients, of the multiple sets of delay coefficients, is associated with a second network loading level different from the first network loading level.

5. The method of claim 3,
wherein a first subset of sets of delay coefficients, of the multiple sets of delay coefficients, is associated with uplink communications, and
wherein a second subset of sets of delay coefficients, of the multiple sets of delay coefficients, is associated with downlink communications.

6. The method of claim 1,
wherein the communication link is associated with at least one of:
a quality of service class identifier,
a 5G quality of service flow identifier,
a service profile identifier,
a radio access technology frequency selection priority index,
single-network slice selection assistance information, or
a public land mobile network identifier.

7. The method of claim 1,
wherein estimating the packet delay associated with the communication link includes using a machine learning model to estimate the packet delay associated with the communication link based on the performance measurements.

8. The method of claim 7, further comprising:
measuring packet delay metrics associated with the communication link; and
training the machine learning model based on the performance measurements and the packet delay metrics.

9. The method of claim 7, further comprising:
determining a network loading level associated with the communication link; and
training the machine learning model based on the performance measurements and the network loading level.

10. The method of claim 7,
wherein the machine learning model is based on at least one of:
a network loading level associated with the communication link,
HARQ statistics associated with the communication link, or
setting information associated with the communication link.

11. The method of claim 1,
wherein each HARQ retransmission group corresponds to a number of HARQ retransmissions.

12. The method of claim 1,
wherein the set of delay coefficients are empirically determined based on the performance measurements.

13. A network node, comprising:
one or more processors configured to:
collect performance measurements associated with a communication link between a network node and a user equipment, the performance measurements including at least one of:
a total number of packets associated with each hybrid automatic repeat request (HARQ) retransmission group, of multiple HARQ retransmission groups associated with the communication link, or
a total data volume associated with each HARQ retransmission group, of the multiple HARQ retransmission groups associated with the communication link;
determine, based on a link direction of the communication link, a set of delay coefficients associated with the communication link; and
estimate a packet delay associated with the communication link based on the performance measurements and the set of delay coefficients.

14. The network node of claim 13,
wherein the set of delay coefficients includes, for each HARQ retransmission group, a corresponding delay coefficient, and wherein, to estimate the packet delay associated with the communication link, the one or more processors are further configured to estimate the packet delay associated with the communication link based on at least one of:
a sum of products of the total number of packets associated with each HARQ retransmission group and the corresponding delay coefficient, divided by a product of a total number of transmitted packets and one minus a residual block error rate (BLER), or a sum of products of the total data volume associated with each HARQ retransmission group and the corresponding delay coefficient, divided by the product of the total number of transmitted packets and one minus the residual BLER.

15. The network node of claim 13,
wherein the one or more processors, to estimate the packet delay associated with the communication link, are configured to use a machine learning model to estimate the packet delay associated with the communication link based on the performance measurements.

16. The network node of claim 15,
wherein the one or more processors are further configured to:
measure packet delay metrics associated with the communication link;
determine a network loading level associated with the communication link; and
train the machine learning model based on the performance measurements, the packet delay metrics, and the network loading level.

17. The network node of claim 13,
wherein each HARQ retransmission group corresponds to a number of HARQ retransmissions.

18. A non-transitory computer-readable medium storing a set of instructions, the set of instructions comprising:
one or more instructions that, when executed by one or more processors of a network node, cause the network node to:
collect performance measurements associated with a communication link between a network node and a user equipment, the performance measurements including at least one of:
a total number of packets associated with each hybrid automatic repeat request (HARQ) retransmission group, of multiple HARQ retransmission groups associated with the communication link, or
a total data volume associated with each HARQ retransmission group, of the multiple HARQ retransmission groups associated with the communication link;
determine, based on a link direction of the communication link, a set of delay coefficients associated with the communication link; and
estimate a packet delay associated with the communication link based on the performance measurements and the set of delay coefficients.

19. The non-transitory computer-readable medium of claim 18,
wherein the set of delay coefficients includes, for each HARQ retransmission group, a corresponding delay coefficient, and wherein estimating the packet delay associated with the communication link is based on at least one of:
a sum of products of the total number of packets associated with each HARQ retransmission group and the corresponding delay coefficient, divided by a product of a total number of transmitted packets and one minus a residual block error rate (BLER), or
a sum of products of the total data volume associated with each HARQ retransmission group and the corresponding delay coefficient, divided by the product of the total number of transmitted packets and one minus the residual BLER.

20. The non-transitory computer-readable medium of claim 18,
wherein the one or more instructions, that cause the network node to estimate the packet delay associated with the communication link, cause the network node to use a machine learning model to estimate the packet delay associated with the communication link based on the performance measurements.

\* \* \* \* \*